(12) United States Patent
Lee et al.

(10) Patent No.: US 10,728,905 B2
(45) Date of Patent: *Jul. 28, 2020

(54) COMMUNICATION SYSTEM AND METHOD FOR MITIGATING INTERFERENCE IN HIERARCHICAL CELL STRUCTURE

(71) Applicant: Samsung Electronics Co., Ltd., Suwon-si, Gyeonggi-do (KR)

(72) Inventors: Sang Min Lee, Seoul (KR); Tak Ki Yu, Yongin-si (KR); Yung Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,980

(22) Filed: Apr. 26, 2019

(65) Prior Publication Data

US 2019/0254040 A1 Aug. 15, 2019

Related U.S. Application Data

(63) Continuation of application No. 15/852,358, filed on Dec. 22, 2017, now Pat. No. 10,278,191, which is a continuation of application No. 15/344,984, filed on Nov. 7, 2016, now Pat. No. 9,860,904, which is a continuation of application No. 13/891,567, filed on
(Continued)

(30) Foreign Application Priority Data

Apr. 1, 2009 (KR) ........................ 10-2009-0027957

(51) Int. Cl.
*H04W 16/32* (2009.01)
*H04W 72/08* (2009.01)
*H04W 24/08* (2009.01)
*H04W 72/04* (2009.01)
*H04W 88/08* (2009.01)

(52) U.S. Cl.
CPC ......... *H04W 72/082* (2013.01); *H04W 16/32* (2013.01); *H04W 24/08* (2013.01); *H04W 72/0433* (2013.01); *H04W 72/0446* (2013.01); *H04W 72/042* (2013.01); *H04W 88/08* (2013.01)

(58) Field of Classification Search
CPC ... H04W 72/082; H04W 16/32; H04W 24/08; H04W 72/0433; H04W 72/0446; H04W 72/042; H04W 88/08; H04W 72/10
See application file for complete search history.

(56) References Cited

U.S. PATENT DOCUMENTS 6,201,972 B1 3/2001 Hamabe
7,876,741 B2 1/2011 Joung et al.
(Continued)

*Primary Examiner* — Jean A Gelin
(74) *Attorney, Agent, or Firm* — Jefferson IP Law, LLP

(57) ABSTRACT

A method for mitigating interference at a small base station in a hierarchical cell structure is provided. In the method, the small base station checks a sub-frame allocated to macro user equipment by using a downlink signal received from a macro base station when an interference candidate user equipment list is received. The interference candidate user equipment list contains information on the macro user equipment adjacent to a femto cell controlled by the small base station. Then the small base station allocates other sub-frame to femto user equipment located in the femto cell by avoiding the sub-frame allocated to the macro user equipment.

12 Claims, 7 Drawing Sheets

Related U.S. Application Data

May 10, 2013, now Pat. No. 9,491,771, which is a continuation of application No. 13/564,086, filed on Aug. 1, 2012, now Pat. No. 8,457,649, which is a continuation of application No. 12/752,584, filed on Apr. 1, 2010, now Pat. No. 8,244,262.

(56) References Cited

U.S. PATENT DOCUMENTS

| | | | |
|---|---|---|---|
| 8,027,681 B2 | 9/2011 | Burgess et al. | |
| 8,050,629 B2 | 11/2011 | Foster et al. | |
| 8,160,006 B2 * | 4/2012 | Chang | H04B 7/155 |
| | | | 370/329 |
| 8,248,923 B2 | 8/2012 | Czaja et al. | |
| 8,280,387 B2 | 10/2012 | Guvenc et al. | |
| 8,477,868 B2 * | 7/2013 | Han | H04B 7/068 |
| | | | 375/259 |
| 2006/0079268 A1 | 4/2006 | Livet et al. | |
| 2006/0280147 A1 | 12/2006 | Rizvi et al. | |
| 2008/0096573 A1 | 4/2008 | Chu | |
| 2008/0153530 A1 | 6/2008 | Cho et al. | |
| 2008/0220791 A1 | 9/2008 | Cho et al. | |
| 2009/0046665 A1 | 2/2009 | Robson et al. | |
| 2009/0185632 A1 | 7/2009 | Cai et al. | |
| 2009/0221295 A1 | 9/2009 | Sahin et al. | |
| 2009/0253461 A1 | 10/2009 | Kuwahara | |
| 2009/0291690 A1 | 11/2009 | Guvenc et al. | |
| 2009/0296641 A1 | 12/2009 | Bienas et al. | |
| 2009/0325625 A1 | 12/2009 | Hugl et al. | |
| 2010/0008282 A1 | 1/2010 | Bhattad et al. | |
| 2010/0008317 A1 | 1/2010 | Bhattad et al. | |
| 2010/0056184 A1 | 3/2010 | Vakil et al. | |
| 2010/0067514 A1 | 3/2010 | Luo et al. | |
| 2010/0080166 A1 | 4/2010 | Palanki et al. | |
| 2010/0136989 A1 | 6/2010 | Westerberg et al. | |
| 2010/0173637 A1 | 7/2010 | Damnjanovic et al. | |
| 2010/0189084 A1 | 7/2010 | Chen et al. | |
| 2010/0216478 A1 | 8/2010 | Buddhikot et al. | |
| 2010/0222062 A1 | 9/2010 | Chou et al. | |
| 2010/0222068 A1 | 9/2010 | Gaal et al. | |
| 2010/0240386 A1 | 9/2010 | Hamabe et al. | |
| 2010/0329220 A1 * | 12/2010 | Kim | H04W 72/1289 |
| | | | 370/336 |
| 2011/0128916 A1 | 6/2011 | Kwon et al. | |
| 2011/0244870 A1 | 10/2011 | Lee | |
| 2011/0286407 A1 | 11/2011 | Vajapeyam et al. | |
| 2011/0299446 A1 | 12/2011 | Chun et al. | |
| 2012/0020309 A1 | 1/2012 | Malladi et al. | |
| 2012/0300738 A1 * | 11/2012 | Palanki | H04L 5/0053 |
| | | | 370/329 |
| 2013/0064218 A1 * | 3/2013 | Sundaresan | H04W 72/04 |
| | | | 370/330 |
| 2013/0343214 A1 * | 12/2013 | Yamamoto | H04W 72/085 |
| | | | 370/252 |

\* cited by examiner

COMMUNICATION SYSTEM AND METHOD FOR MITIGATING INTERFERENCE IN HIERARCHICAL CELL STRUCTURE

PRIORITY

This application is a continuation application of prior application Ser. No. 15/852,358, filed on Dec. 22, 2017, which is a continuation of prior application Ser. No. 15/344,984, filed on Nov. 7, 2016, which has issued as U.S. Pat. No. 9,860,904 on Jan. 2, 2018, which is a continuation of prior application Ser. No. 13/891,567, filed on May 10, 2013, which has issued as U.S. Pat. No. 9,491,771 on Nov. 8, 2016, which is a continuation of prior application Ser. No. 13/564,086, filed on Aug. 1, 2012, which has issued as U.S. Pat. No. 8,457,649 on Jun. 4, 2013, which is a continuation of prior application Ser. No. 12/752,584, filed on Apr. 1, 2010, which has issued as U.S. Pat. No. 8,244,262 on Aug. 14, 2012 and was based on and claimed priority under 35 U.S.C. § 119(a) of a Korean patent application number 10-2009-0027957, filed on Apr. 1, 2009, in the Korean Intellectual Property Office, the disclosure of which is incorporated by reference herein in its entirety.

BACKGROUND OF THE INVENTION

1. Field of the Invention

Aspects of the present invention relate to a method for mitigating interference between user equipment in a hierarchical cell structure and to a communication system executing the above method. More particularly, aspects of the present invention relate to a method for mitigating interference which may occur between user equipment located in a macro cell and a femto cell when the femto cell containing a small base station is disposed within the macro cell controlled by a macro base station, and also to such a macro base station and such a small base station executing the above method.

2. Description of the Related Art

FIG. 1 is a schematic view illustrating a communication system with a hierarchical cell structure according to the related art.

Referring to FIG. 1, a communication system includes a macro base station 100 as a normal cellular network, and a plurality of small base stations 200a, 200b, and 200c. Normally, a small base station, such as the plurality of small base stations 200a, 200b, or 200c, is designed as an in-house base station for use in residential or small business environments, hence covers an extremely limited range, and is often referred to as a femto cell or a pico cell. The small base station 200a, 200b, or 200c for controlling such small cells is often referred to as a Home Node B (HNB). The cell coverage area of the small base station 200a, 200b or 200c is much smaller than that of the macro base station 100.

Since the macro base station 100 covers a broader range than the small base station 200a, 200b, or 200c, the macro base station 100 performs frequency allocation using a Frequency Division Duplex (FDD) scheme. The small base station 200a, 200b, or 200c performs frequency allocation using a Time Division Duplex (TDD) scheme. The FDD scheme supports two-way radio communication through two distinct frequency channels. The TDD scheme uses a single frequency channel with time slots to transmit signals in both the downstream and upstream directions.

FIG. 2 is a schematic view illustrating an allocation of frequency bands in a communication system including a macro base station and a small base station according to the related art.

Referring to FIG. 2, the frequency bandwidth allocated to each communication system may be 2 GHz or 2.5 GHz.

In FIG. 2, case (a) shows the allocation of frequency bands for the macro base station and the small base station on the assumption that the frequency bandwidth is 2 GHz. In case (a), two frequency bands 1900~1920 MHz and 2010~2025 MHz are allocated to TDD channels used in the small base station 200a, 200b, or 200c. Other frequency bands 1920~1980 MHz and 2110~2170 MHz are allocated respectively to uplink (UL) and downlink (DL) channels of FDD used in the macro base station 100.

Case (b) in FIG. 2 shows the allocation of frequency bands for the macro base station and the small base station on the assumption that the frequency bandwidth is 2.5 GHz. In case (b), two frequency bands 2500~2570 MHz and 2620~2690 MHz are allocated respectively to uplink (UL) and downlink (DL) channels of FDD used in the macro base station 100. Another frequency band 2570~2620 MHz is allocated to a TDD channel used in the small base station 200a, 200b or 200c.

In frequency allocation environments as shown in FIG. 2, a frequency band allocated to FDD channels used in the macro base station may be adjacent to another frequency band allocated to TDD channels used in the small base station. In this case, unfavorable interference may often occur. The following are examples of the types and features of the interference.

1) Macro Base Station 100 and Small Base Station 200a, 200b, or 200c

Serious interference may occur where the macro base station 100 and a certain one of the small base stations 200a, 200b, and 200c are close to each other. In this case, interference may be mitigated by reducing a transmitting power of the small base station at issue and by increasing a physical distance from the macro base station.

2) Macro Base Station 100 and User Equipment Located in Femto Cell Controlled by Small Base Station 200a, 200b, or 200c

Interference may occur when certain user equipment (namely, femto user equipment) located in a femto cell controlled by the small base station 200a, 200b, or 200c uses a high transmitting power near the macro base station 100. In this case, interference may be mitigated by maintaining a suitable transmitting power of the user equipment at issue and by regulating the coverage of a related small base station.

3) Small Base Station 200a, 200b, or 200c and User Equipment Located in Macro Cell Controlled by Macro Base Station 100

Interference may occur when certain user equipment (namely, macro user equipment) located in a macro cell controlled by the macro base station 100 uses a high transmitting power near the small base station 200a, 200b, or 200c. In this case, the handover for the user equipment at issue may be performed to one of the small base stations 200a, 200b, or 200c. The loss of performance due to interference may not be heavy since there is a low probability that the macro user equipment will exist near the small base stations.

4) Macro User Equipment and Femto User Equipment

FIG. 3 is a schematic view illustrating an occurrence of interference between user equipment according to the related art.

Referring to FIG. 3, interference may occur as indicated by a dashed arrow when certain macro user equipment 320 located in a macro cell controlled by the macro base station 100 is close to certain femto user equipment 340 located in a femto cell controlled by the small base station 200. For example, interference may occur when the macro user equipment 320 uses a high power near the femto user equipment 340 in order to transmit signals to the macro base station 100. This kind of interference may cause the heaviest loss of performance, so a more efficient method for mitigating interference is required.

In order to mitigate interference between the macro user equipment 320 and the femto user equipment 340, a transmitting power control method, a handover method, and a dynamic channel allocation method may be considered.

The transmitting power control method increases a transmitting power of the small base station 200 in a case where the femto user equipment 340 suffers interference from the macro user equipment 320. However, this method may instead increase interference in the uplink channel of the macro user equipment 320.

The handover method performs handover of the macro user equipment 320 to the small base station 200 or of the femto user equipment 340 to the macro base station 100 when interference occurs. However, considering a handover delay time, a closed access scenario of the small base station, a load balancing between cells, etc., this method may not be sufficient to mitigate interference. Although the handover may be somewhat effective in mitigating interference, this method needs an additional way to mitigate interference.

The dynamic channel allocation method allocates different channels to the macro user equipment 320 and the femto user equipment 340. This method divides sub-frames, which are allocated on the basis of time, into first sub-frames used in the macro user equipment 320 and second sub-frames used in the femto user equipment 340 in order to avoid interference. However, this method may have difficulty in regulating the amount of frames used in the macro user equipment 320 and the femto user equipment 340 respectively.

SUMMARY OF THE INVENTION

An aspect of the present invention is to address at least the above-mentioned problems and/or disadvantages and to provide at least the advantages described below. Accordingly, an aspect of the present invention is to provide a method for mitigating interference in a hierarchical cell structure and also to a communication system executing the above method.

In accordance with an aspect of the present invention, a method for mitigating interference at a small base station in a hierarchical cell structure is provided. The method includes checking a sub-frame allocated to macro user equipment via a downlink signal received from a macro base station when an interference candidate user equipment list is received, the interference candidate user equipment list containing information on the macro user equipment adjacent to a femto cell controlled by the small base station, and allocating other sub-frames to femto user equipment located in the femto cell by avoiding the sub-frame allocated to the macro user equipment.

In accordance with another aspect of the present invention, a method for mitigating interference at a macro base station in a hierarchical cell structure is provided. The method includes determining a ratio of uplink to downlink in a small base station, detecting macro user equipment adjacent to the small base station, and allocating a sub-frame corresponding to an uplink time slot of the small base station to the macro user equipment.

In accordance with still another aspect of the present invention, a method for mitigating interference in a communication system with a hierarchical cell structure is provided. The method includes, at a macro base station, detecting macro user equipment adjacent to a small base station after time synchronization between the macro base station and the small base station, at the macro base station, transmitting an interference candidate user equipment list to the small base station, the interference candidate user equipment list containing the detected macro user equipment, at the small base station, detecting a sub-frame allocated to the macro user equipment contained in the interference candidate user equipment list, and at the small base station, allocating a downlink sub-frame to femto user equipment by avoiding an uplink sub-frame allocated to the macro user equipment.

In accordance with yet another aspect of the present invention, a communication system for mitigating interference is provided. The system includes a macro base station for determining the ratio of uplink to downlink in a small base station after time synchronization with the small base station, for detecting macro user equipment adjacent to the small base station, and for allocating a sub-frame corresponding to uplink time slot of the small base station to the macro user equipment, and the small base station for receiving an interference candidate user equipment list from the macro base station, for detecting the sub-frame allocated to the macro user equipment, and for allocating a downlink sub-frame to femto user equipment by avoiding an uplink sub-frame allocated to the macro user equipment.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, a macro base station refers to a base station offering a communication service to a relatively broader range and is often referred to as evolved Node B (eNB) or Node B. A macro cell refers to a service area controlled by the macro base station. Macro user equipment refers to user equipment connected with the macro base station in order to send and receive signals to and from the macro base station. A small base station refers to a base station located within the macro cell and offering a communication service to a relatively smaller range. The small base station is often referred to as a femto base station, a pico base station, or Home Node B (HNB). A femto cell refers to a service area controlled by the femto base station. Femto user equipment refers to user equipment connected with the small base station in order to send and receive signals to and from the femto base station.

Figure 1:
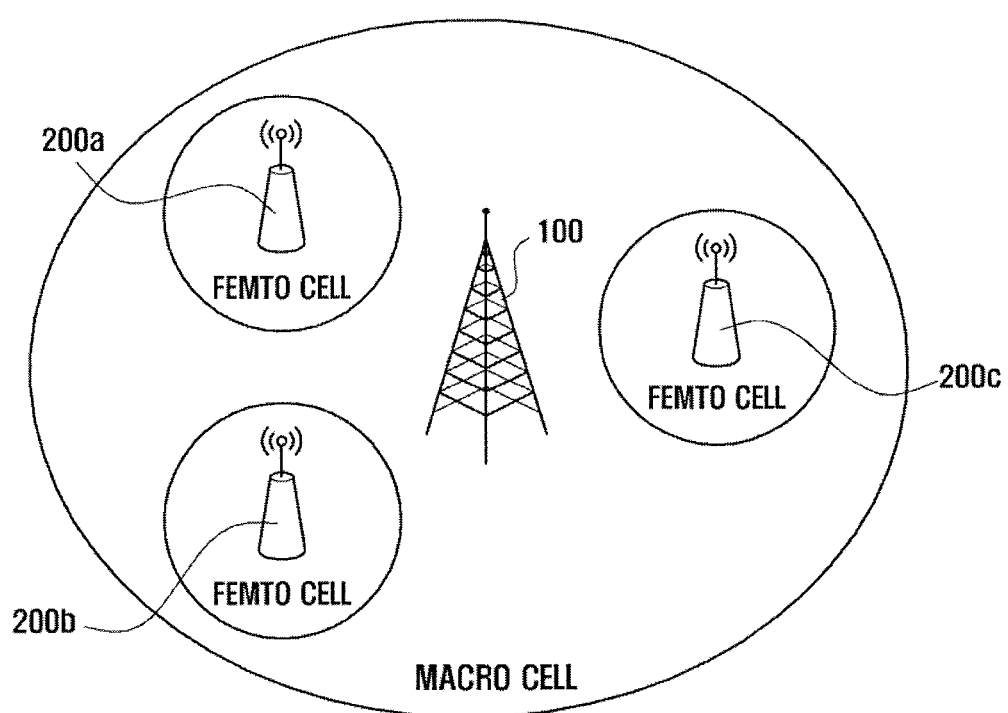
FIG. 1 is a schematic view illustrating a communication system with a hierarchical cell structure according to the related art.
Figure 2:
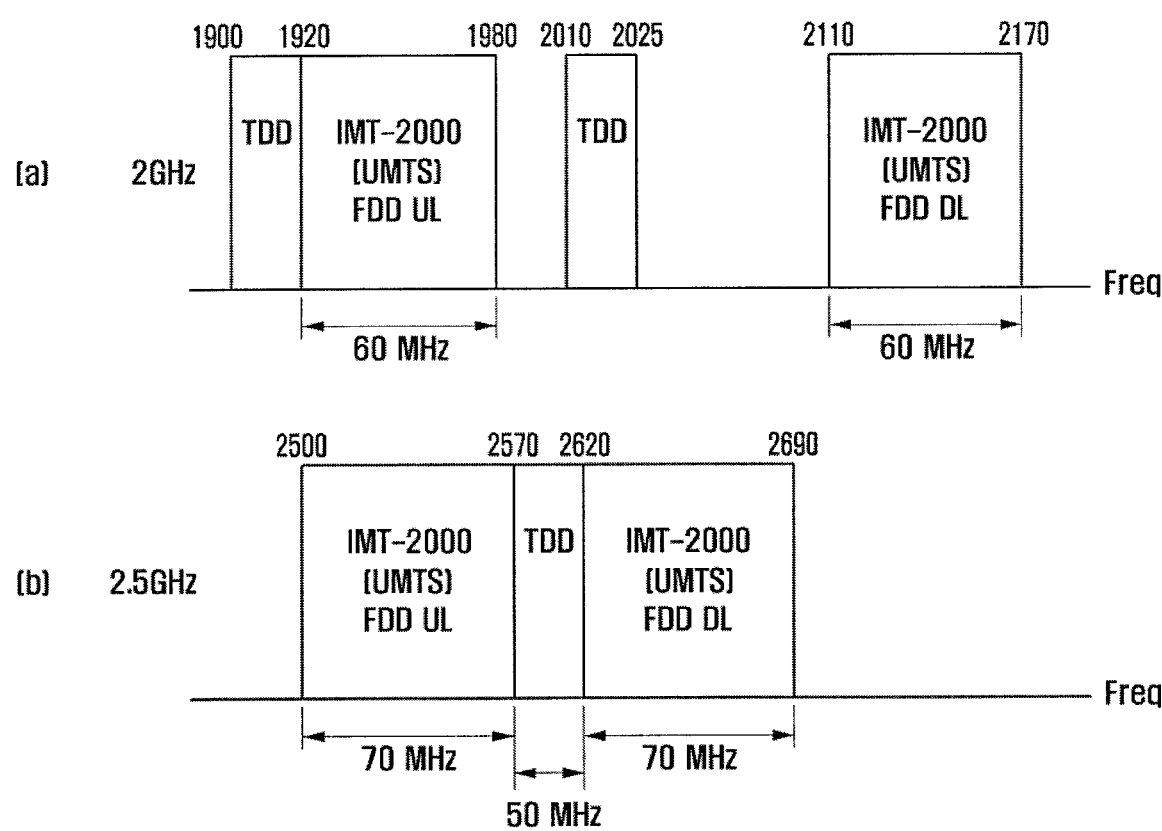
FIG. 2 is a schematic view illustrating an allocation of frequency bands in a communication system including a macro base station and a small base station according to the related art.
Figure 3:
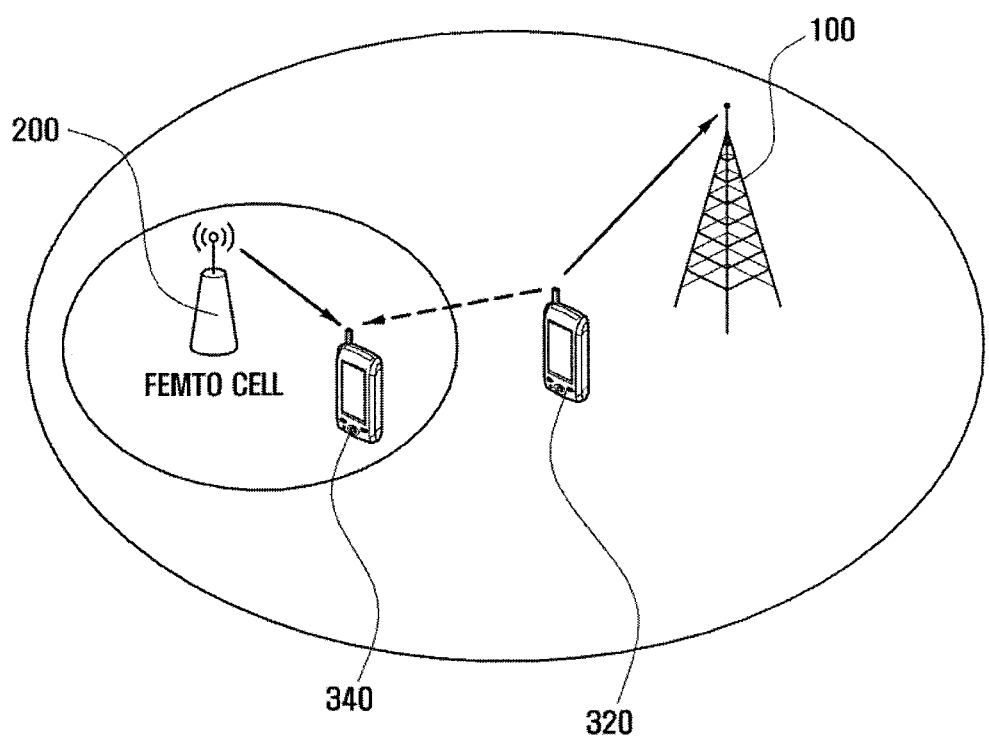
FIG. 3 is a schematic view illustrating an occurrence of interference between user equipments according to the related art.
Figure 4:
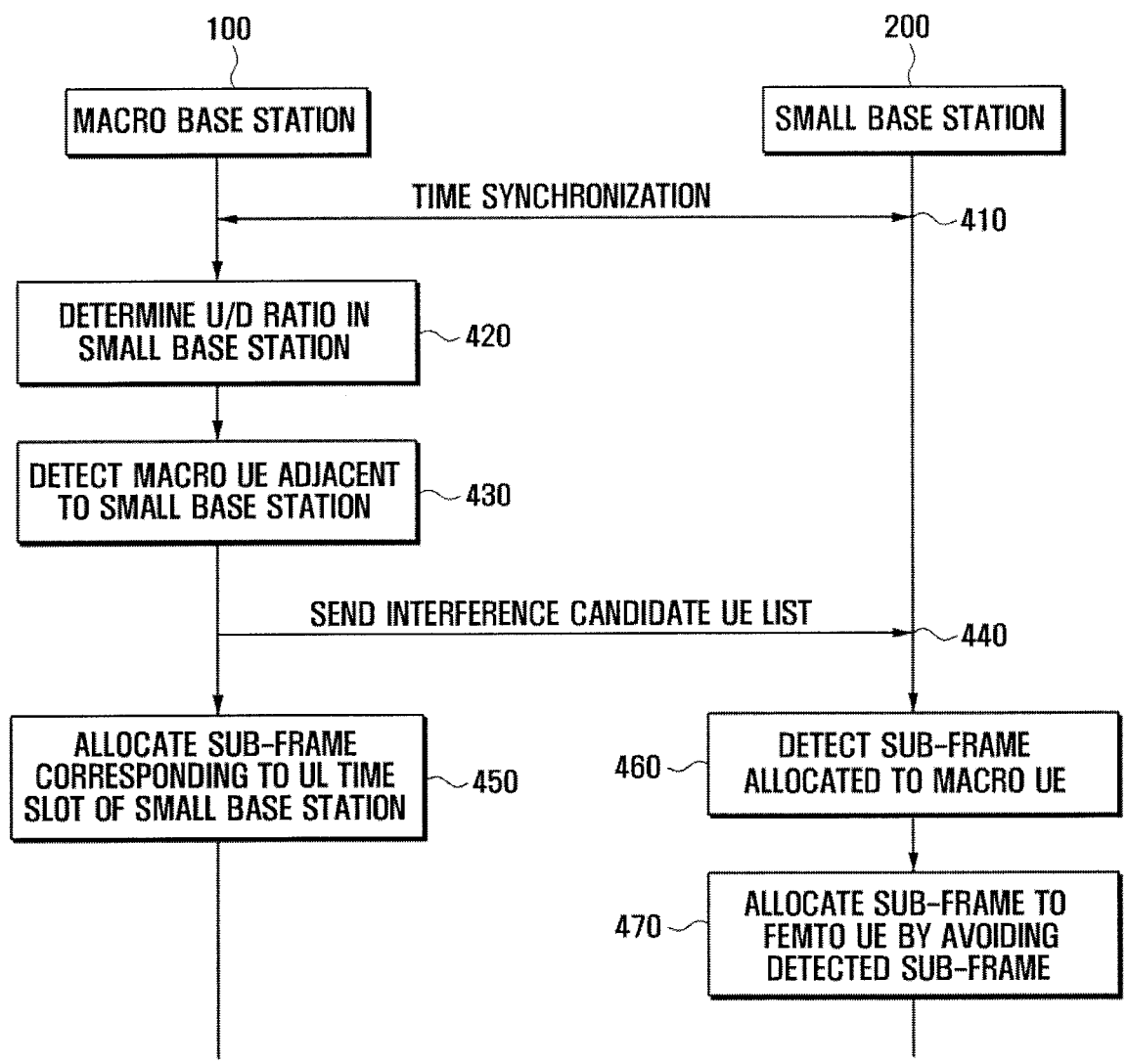
FIG. 4 is a flow diagram illustrating a method for mitigating interference between communication systems according to an exemplary embodiment of the present invention.

FIG. 4 is a flow diagram illustrating a method for mitigating interference between communication systems according to an exemplary embodiment of the present invention.

Referring to FIG. 4, in step 410, both the macro base station 100 and the small base station 200 perform a time synchronization process. The small base station 200 receives a downlink signal from the macro base station 100 and synchronizes the time with the macro base station 100 using control information contained in the received signal. The control information may include the allocation time of the sub-frames for macro user equipment 320, the type of sub-frames allocated to the macro user equipment 320, and detailed information on signals transmitted through sub-frames.

In step 420, the macro base station 100 determines the ratio of uplink to downlink (U/D ratio) in the small base station 200 located in a macro cell. This U/D ratio may be determined through an exchange of information between the small base station 200 and the macro base station 100 when the small base station 200 is installed. The U/D ratio refers to the distribution ratio of uplink sub-frames to downlink sub-frames allocated to femto user equipment 340 by the small base station 200. Table 1 exemplarily shows the U/D ratio in the small base station 200.

TABLE 1

| UL-DL configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | U | U | U | U | D |

In step 430, the macro base station 100 detects the macro user equipment 320 adjacent to the small base station 200. To detect the macro user equipment 320, the macro base station 100 receives a neighbor-cell measurement report from the macro user equipment 320 located in its own cell. The neighbor-cell measurement report contains the signal power strength of neighboring base stations measured by the macro user equipment 320. This report further contains specific identifiers of respective base stations. In an exemplary implementation, the macro base station 100 may receive a plurality of neighbor cell measurement reports from a plurality of respective macro user equipment 320.

In step 440, the macro base station 100 creates a list of interference candidate user equipment (UE) using information on the macro user equipment 320 adjacent to the small base station 200. The macro base station 100 transmits the created list to the small base station 200. The macro base station 100 determines whether the signal power strength between the small base station 200 and the macro user equipment 320 contained in the neighbor-cell measurement report is greater than a given threshold value. This threshold value may be smaller than another value used for determining handover. The above threshold value may be determined through suitable experiments, which may consider several conditions in which interference is likely to occur between the femto user equipment 340 and the macro user equipment 320.

The macro base station 100 selects macro user equipment 320 with higher signal strength than a given threshold value and checks the identifications of the selected macro user equipment 320. This identification may include an identifier which has been already vested in the respective macro user equipment 320 by the macro base station 100. In addition, the macro base station 100 creates the interference candidate UE list using the identification of the selected macro user equipment 320. The macro base station 100 transmits the created list to the small base station 200.

In step 450, the macro base station 100 allocates sub-frames corresponding to uplink time slots of the small base station 200 to the macro user equipment 320 adjacent to the small base station 200. For example, assume that the small base station 200 has the uplink/downlink distribution ratio as shown in Table 1. As shown in Table 1, sub-frames 2, 3, and 7 in the small base station 200 have relatively higher probabilities of uplink allocation. Therefore, when allocating sub-frames to the macro user equipment 320, the macro base station 100 allocates sub-frames 2, 3, and 7 in the order of adjacency to the small base station 200. Since the macro base station 100 allocates, in such a manner, uplink sub-frames of the small base station 200 to the macro user equipment 320 adjacent to the small base station 200, it is possible to mitigate interference which may occur between uplink of the macro user equipment 320 and downlink of the femto user equipment 340.

An exemplary method for performing avoidance allocation to mitigate interference at the small base station 200 will be described with reference to FIG. 4. This method includes time synchronization (step 410), detection of macro user equipment 320 adjacent to the small base station 200 (step 430), transmission of an interference candidate UE list (step 440), detection of sub-frames allocated to the macro user equipment 320 (step 460), and allocation of sub-frames to the femto user equipment 340 while avoiding the detected sub-frames (step 470).

Steps 410 and 430 have been described above, so the repetition of descriptions will be avoided. As discussed previously, the macro base station 100 obtains the interference candidate UE list through the step 430. As also discussed above, in step 440, the macro base station 100 transmits the interference candidate UE list to the small base station 200. This list may be sent through a wired backhaul or a wireless connection such as Over-The-Air (OTA) between the macro base station 100 and the small base station 200.

In step 460, the small base station 200 receives a downlink control signal from the macro base station 100 and detects sub-frames allocated to the macro user equipment 320 contained in the interference candidate UE list. In step 470, the small base station 200 allocates sub-frames to the femto user equipment 340 while avoiding the above-detected sub-frames. A more detailed process of sub-frame allocation to the femto user equipment 340 will be described later with reference to FIG. 6.

Hereinbefore, exemplary methods of sub-frame allocation executed respectively at the macro base station 100 and the small base station 200 in order to mitigate interference between the macro user equipment 320 and the femto user equipment 340 have been described with reference to FIG. 4. A method for mitigating interference at the macro base station 100 will now be described in more detail.

Figure 5:
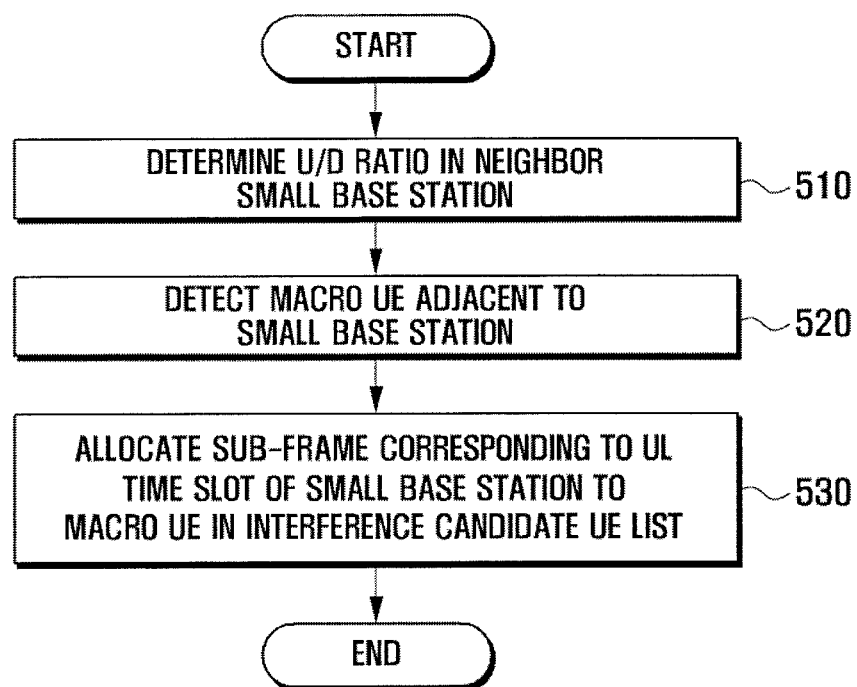
FIG. 5 is a flow diagram illustrating a method for mitigating interference at a macro base station according to an exemplary embodiment of the present invention.

FIG. 5 is a flow diagram illustrating a method for mitigating interference at a macro base station according to an exemplary embodiment of the present invention.

Referring to FIG. 5, the macro base station 100 determines the ratio of uplink to downlink (U/D ratio) in the small base station 200 using downlink signals received from the small base station 200 in step 510.

In step 520, the macro base station 100 detects the macro user equipment 320 adjacent to the small base station 200. For such detection, the macro base station 100 may use a neighbor-cell measurement report received from respective macro user equipment 320. Although not shown, the macro base station 100 creates the interference candidate UE list using the identification of the macro user equipment 320 adjacent to the small base station 200. The macro base station 100 may transmit the created list to the small base station 200.

In step 530, the macro base station 100 allocates sub-frames corresponding to uplink time slots of the small base station 200 to the macro user equipment 320 contained in the interference candidate UE list.

An exemplary method for allocating sub-frames to the femto user equipments 340 in order to mitigate interference at the small base station 200 will now be described in more detail.

Figure 6:
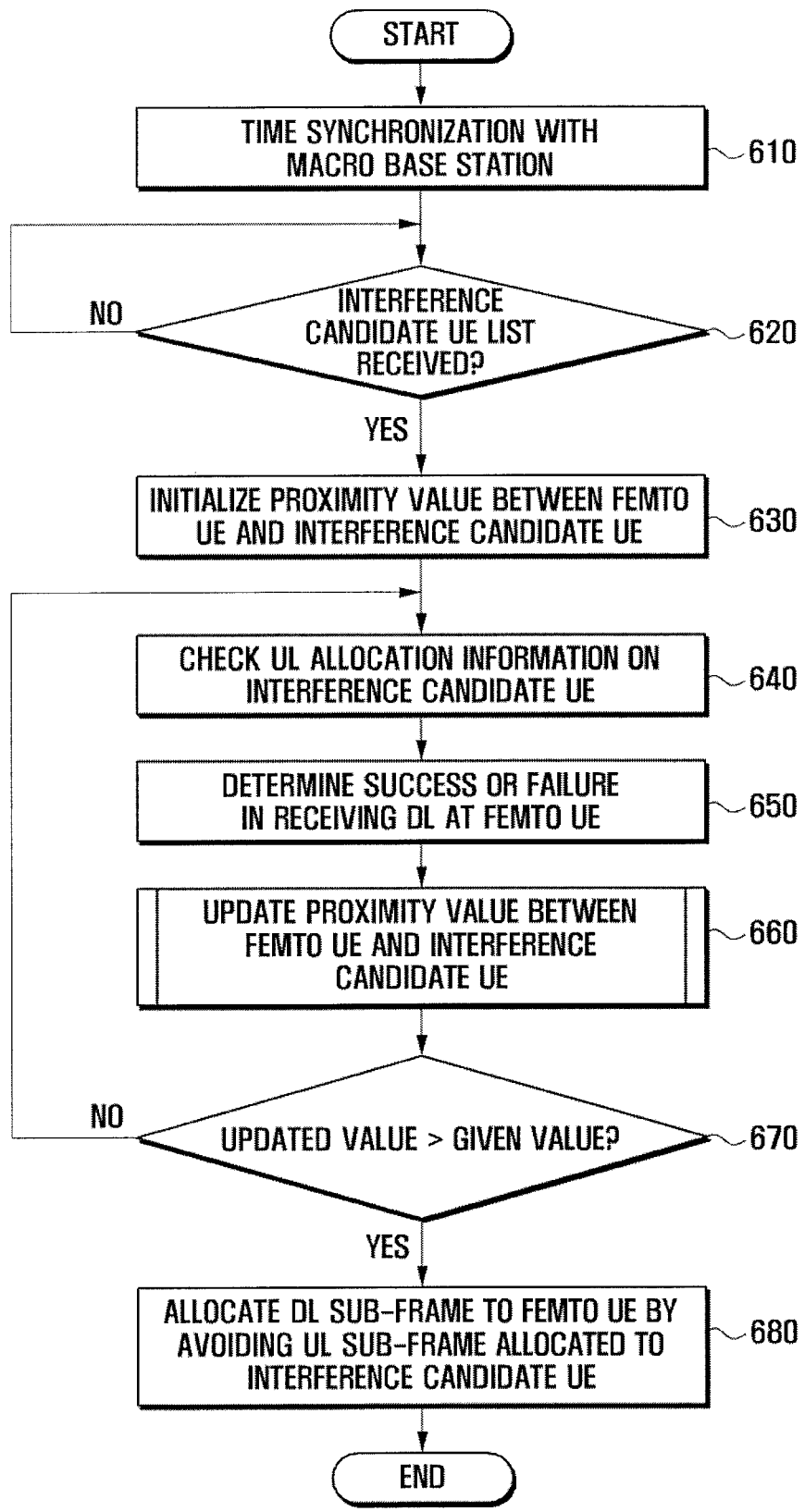
FIG. 6 is a flow diagram illustrating a method for performing avoidance allocation to mitigate interference at a small base station according to an exemplary embodiment of the present invention.

FIG. 6 is a flow diagram illustrating a method for performing avoidance allocation to mitigate interference at the small base station according to an exemplary embodiment of the present invention.

Referring to FIG. 6, in step 610, the small base station 200 synchronizes the time with the macro base station 100 using downlink signals of the macro base station 100. The small base station 200 determines whether the interference candidate UE list is received from the macro base station in step 620. If it is determined in step 620 that the interference candidate UE list is received, the small base station 200 proceeds to step 630 and initializes the value of proximity between the femto user equipment 340 and interference candidate user equipment contained in the list. The initialization of the value of proximity between the femto user equipment 340 and interference candidate user equipment may be represented as an expression 'I(A, B, n)=0'. Here, 'A' refers to the interference candidate user equipment, 'B' refers to the femto user equipment 340, and 'n' refers to the time index. The interference candidate user equipment refers to macro user equipment located near a cell controlled by the small base station 200, among the macro user equipment 320 communicating with the macro base station 100.

In step 640, the small base station 200 checks uplink allocation information of the interference candidate user equipment. The small base station 200 finds the interference candidate user equipment to which uplink sub-frames are allocated. The interference candidate user equipment includes some of the macro user equipment 320 located in a cell controlled by the macro base station 100. Therefore, uplink allocation information of the interference candidate user equipment may be checked through downlink signals transmitted from the macro base station 100. The downlink signal from the macro base station 100 may include a Physical Downlink Control Channel (PDCCH), which contains information on sub-frames allocated to each macro user equipment 320 and information on whether each allocated sub-frame is uplink or downlink.

In step 650, the small base station 200 determines success or failure in receiving downlink at the femto user equipment. Depending on success or failure, the small base station 200 updates the value of proximity between the femto user equipment 340 and the interference candidate user equipment in step 660. This updating step 660 is specifically shown in FIG. 7.

Figure 7:
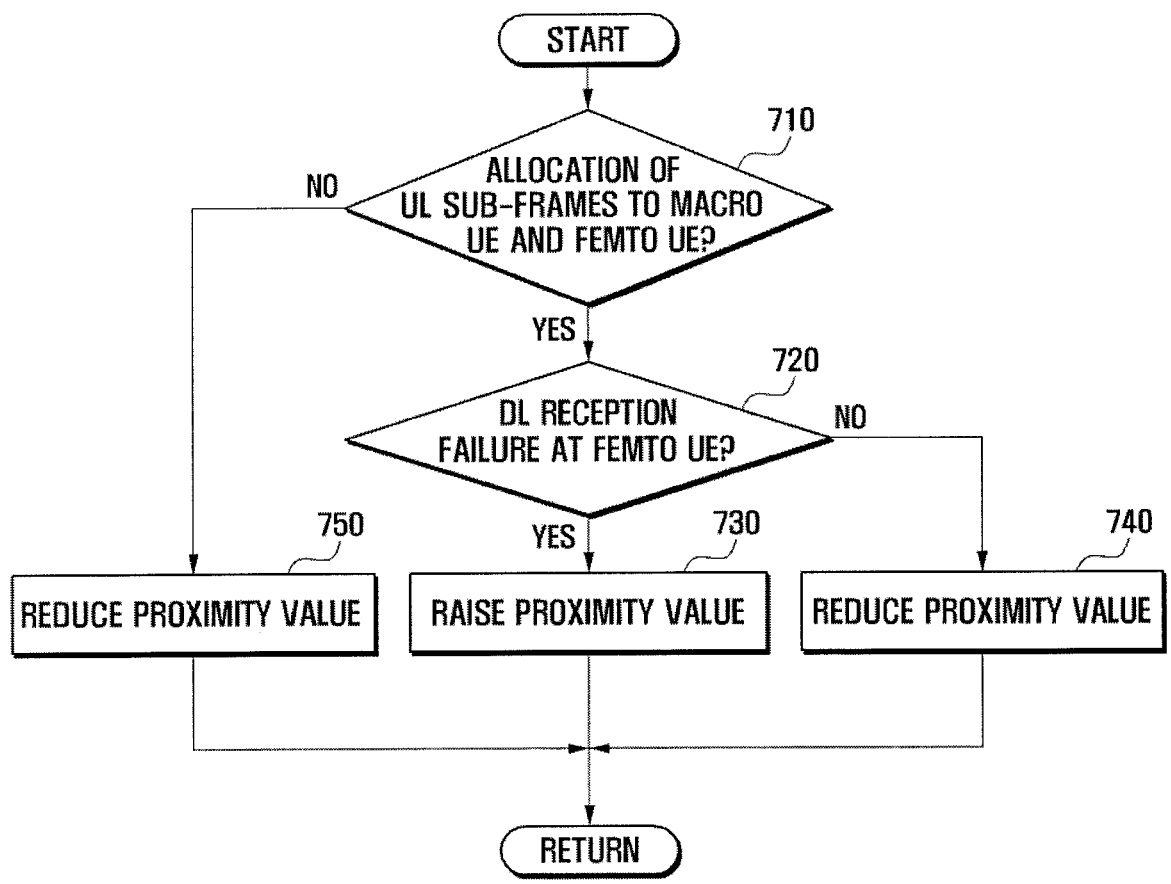
FIG. 7 is a flow diagram illustrating a method for calculating proximity between user equipments according to an exemplary embodiment of the present invention.

FIG. 7 is a flow diagram illustrating a method for calculating proximity between user equipment according to an exemplary embodiment of the present invention.

Referring to FIG. 7, in step 710, the small base station 200 determines whether uplink sub-frames are simultaneously allocated to both the macro user equipment 320 and the femto user equipment 340. If it is determined in step 710 that uplink sub-frames are simultaneously allocated to both the macro user equipment 320 and the femto user equipment 340, the small base station 200 proceeds to step 720 and further determines whether the femto user equipment 340 fails to receive downlink.

If it is determined in step 720 that the femto user equipment 340 fails to receive downlink, the small base station 200 raises the value of proximity between the femto user equipment 340 and the macro user equipment 320 in step

730. In this step, the small base station 200 calculates the raised value of proximity by using Equation 1.

$$I(A,B,n+1)=a*I(A,B,n)+(1-a)*T, 0 \leq a \leq 1 \quad \text{Equation 1}$$

Here, 'I(A, B, n+1)' refers to the raised value of proximity. The references 'A', 'B' and 'n' refer to the macro user equipment 320, the femto user equipment 340, and the time index, respectively. The references 'a' and 'T' refer to a forgetting factor and a time function, respectively.

On the other hand, if it is determined in step 720 that the femto user equipment 340 succeeds in receiving downlink, the small base station 200 reduces the value of proximity between the femto user equipment 340 and the macro user equipment 320 in step 740. In this step, the small base station 200 calculates the reduced value of proximity using Equation 2.

$$I(A,B,n+1)=b*I(A,B,n), 0 \leq b \leq 1 \quad \text{Equation 2}$$

Here, 'b' refers to a weight used to reduce the value of proximity. In case of success in receiving downlink at the femto user equipment 340, the small base station 200 determines that the macro user equipment 320 and the femto user equipment 340 are not adjacent to each other, and then reduces the value of proximity.

If it is determined in step 710 that uplink sub-frames are not simultaneously allocated to both the macro user equipment 320 and the femto user equipment 340, the small base station 200 proceeds to step 750 and reduces the value of proximity between the femto user equipment 340 and the macro user equipment 320. In this step, the small base station 200 calculates the reduced value of proximity using Equation 3.

$$I(A,B,n+1)=c*I(A,B,n), 0 \leq c \leq 1 \quad \text{Equation 3}$$

Here, 'c' refers to a forgetting factor regarding the proximity value in process of time.

Depending on the updated proximity value calculated through Equation 1, 2, or 3, the small base station 200 can determine whether the macro user equipment 320 and the femto user equipment 340 are adjacent to each other.

Returning to FIG. 6, after updating the proximity value in step 660, the small base station 200 determines whether the updated proximity value is greater than a given threshold value in step 670. If it is determined in step 670 that the updated proximity value is greater than the given threshold value, the small base station 200 proceeds to step 680 and allocates downlink sub-frames to the femto user equipment 340 while avoiding uplink sub-frames allocated to the interference candidate user equipment. If it is determined in step 670 that the updated proximity value is not greater than the given threshold value, the small base station 200 returns to the aforesaid step 640.

As fully discussed hereinbefore, the small base station 200 receives downlink signals of the macro base station 100 and then checks sub-frame time allocated to uplink of the macro user equipment 320 located near the femto cell. By avoiding the checked sub-frame time, the small base station 200 can allocate downlink sub-frames to the femto user equipment 340.

Uplink of the macro user equipment 320 causing interference transmits allocation information within the sub-frame time (for example, 4 frames in case of Long Term Evolution (LTE)). Therefore, the small base station 200 can detect in advance uplink sub-frame of the macro user equipment 320. Depending on the type of the sub-frame of the macro user equipment 320, the small base station 200 can allocate downlink sub-frames to the femto user equipment 340 so that such sub-frames do not overlap with uplink sub-frames of the macro user equipment 320. This method can prevent interference occurring between the macro user equipment 320 and the femto user equipment 340.

Accordingly, exemplary embodiments of the present invention mitigate interference which may occur between the macro user equipment in the macro cell and the femto user equipment in the femto cell. Namely, by avoidance allocation between sub-frame for macro user equipment and sub-frame for femto user equipment, it is possible to mitigate interference.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for mitigating interference at a first base station in a wireless communication system, the method comprising:
   receiving control information;
   identifying a subframe so as to mitigate interference between the first base station and a second base station, based on the control information to process a signal; and
   allocating, based at least in part on the control information, the subframe as a first resource associated with a first measurement for a first resource allocation for communication between the first base station and a user equipment in communication with the first base station in the wireless communication system,
   wherein the first subframe is not allocated as a second resource associated with a second measurement for a second resource allocation for communication between the second base station and a user equipment in communication with the second base station in the wireless communication system.

2. The method of claim 1, wherein the control information is received via a wired backhaul.

3. A first base station in a wireless communication system, the first base station comprising:
   a transceiver for transmitting and receiving a signal; and
   a controller for receiving control information, identifying a subframe so as to mitigate interference between the first base station and a second base station, based on the control information to process a signal, and allocating, based at least in part on the control information, the subframe as a resource associated with a measurement for a resource allocation for communication between the first base station and a user equipment in communication with the first base station in the wireless communication system,
   wherein the first subframe is not allocated as a resource associated with a measurement for a resource allocation for communication between the second base station and a user equipment in communication with the second base station in the wireless communication system.

4. The first base station of claim 3, wherein the control information is received via a wired backhaul.

5. A method for receiving a downlink signal by a user equipment in a wireless communication system, the method comprising:
   receiving control information from a first base station;
   identifying a first subframe allocated as a first resource associated with a first measurement for a first resource allocation for communication between the first base station and a user equipment in communication with the first base station in the wireless communication system; and receiving a downlink signal in the first subframe, wherein the first subframe is not allocated as a resource associated with a measurement for a resource allocation for communication between a second base station and a user equipment in communication with the second base station in the wireless communication system.

6. The method of claim 5, wherein a ratio of the first subframe and a second subframe is determined based on information exchanged between the first base station and the second base station, and wherein the second subframe is allocated as a second resource for communication between the first base station and a user equipment in communication with the first base station in the wireless communication system.

7. The method of claim 6, wherein a transmission power of the first base station is increased when the user equipment in communication with the first base station in the wireless communication system is interfered with by the user equipment in communication with the second base station in the wireless communication system.

8. The method of claim 7, further comprising:

transmitting information indicating whether or not a reception of the downlink signal is successful.

9. A user equipment for receiving a downlink signal in a wireless communication system, the user equipment comprising:

a transceiver configured to transmit and receive a signal; and at least one processor configured to:

control to receive control information from a first base station, identify a first subframe allocated as a first resource associated with a first measurement for a first resource allocation for communication between the first base station and a user equipment in communication with the first base station in the wireless communication system, and receive a downlink signal in the first subframe, wherein the first subframe is not allocated as a resource associated with a measurement for a resource allocation for communication between a second base station and a user equipment in communication with the second base station in the wireless communication system.

10. The user equipment of claim 9, wherein a ratio of the first subframe and a second subframe is determined based on information exchanged between the first base station and the second base station, and wherein the second subframe is allocated as a second resource for communication between the first base station and a user equipment in communication with the first base station in the wireless communication system.

11. The user equipment of claim 9, wherein a transmission power of the first base station is increased when the user equipment in communication with the first base station in the wireless communication system is interfered with by the user equipment in communication with the second base station in the wireless communication system.

12. The user equipment of claim 9, wherein the at least one processor is further configured to control to transmit information indicating whether or not a reception of the downlink signal is successful.

\* \* \* \* \*